United States Patent
Spey et al.

(10) Patent No.: US 7,055,905 B2
(45) Date of Patent: Jun. 6, 2006

(54) MOTOR VEHICLE SEAT WITH ADJUSTABLE RECLINING BACKREST

(75) Inventors: Gunter Spey, Heuerssen (DE); Bernd Wilkening, Beckedorf (DE)

(73) Assignee: Faurecia Autositze GmbH & Co. KG (DE)

( * ) Notice: Subject to any disclaimer, the term of this patent is extended or adjusted under 35 U.S.C. 154(b) by 0 days.

(21) Appl. No.: 10/986,600

(22) Filed: Nov. 10, 2004

(65) Prior Publication Data

US 2005/0099049 A1 May 12, 2005

(30) Foreign Application Priority Data

Nov. 11, 2003 (DE) ................................ 103 52 630

(51) Int. Cl.
*B60N 2/48* (2006.01)
(52) U.S. Cl. ................ 297/361.1; 297/463.1; 297/354.1
(58) Field of Classification Search ............ 297/361.1, 297/463.1, 354.1
See application file for complete search history.

(56) References Cited

U.S. PATENT DOCUMENTS 6,474,734 B1 * 11/2002 Masuda et al. ............. 297/366
6,712,429 B1 * 3/2004 Villarroel ................. 297/361.1
6,799,806 B1 * 10/2004 Eppert et al. ............ 297/463.1

FOREIGN PATENT DOCUMENTS

DE 32 29 107 C2 2/1984
DE 33 25 045 C2 1/1985

* cited by examiner

Primary Examiner—Laurie K. Cranmer
(74) Attorney, Agent, or Firm—Synnestvedt Lechner & Woodbridge LLP

(57) ABSTRACT

The present invention relates to a motor vehicle seat with an adjustable reclining backrest, which is articulated to the seat frame on both sides using tilt adjusting fittings. Both tilt adjusting fittings are coupled to each other by a rigid connecting tube, which is formed as a hollow section or at least in the zone of the tilt adjusting fittings as a hollow section. It is used for the simultaneous adjustment of both tilt adjusting fittings by means of a driving device arranged on one side of the seat. The connecting element is fastened bilaterally to one of the two tilt adjusting fittings, so that it is secured on both sides against an axial movement. The object of the invention is to improve this type of seat so that a folding back or opening of the tilt adjusting fittings is prevented while at the same time mounting of the connecting elements without problematic rattling and axial jamming is made possible. Said object is achieved in that the connecting element (5) has a stop (21) on the outside of the other tilt adjusting fitting (3) with an axial play (22) relative to said tilt adjusting fitting (3), which is smaller than the width (b) of the locking toothing (8).

10 Claims, 4 Drawing Sheets

MOTOR VEHICLE SEAT WITH ADJUSTABLE RECLINING BACKREST

CROSS REFERENCE TO RELATED APPLICATIONS

This application claims the priority of German Patent Application 103 52 630.7 filed on Nov. 11, 2003, the entire contents of which is hereby incorporated in total by reference.

BACKGROUND OF THE INVENTION

1. Field of the Invention

The present invention relates to a motor vehicle seat with an adjustable reclining backrest in accordance with the superordinate concept of claim 1.

2. Description of Related Art

In motor vehicle seats with manual tilt adjustment of the backrest the connecting element of the two tilt adjustment fittings are configured as hollow sections with a relatively small radial dimension in order to economize on weight. In comparison to electrical motor drives, this is possible, because the connecting element must transmit a relatively low torque from one to the other tilt adjusting fitting. In electrical motor driven connecting elements these are configured as solid sections according to the prior art.

In order to assure that the connecting element does not "wander out" of the tilt adjusting fitting or is not propelled out in the event of a side impact, it is necessary to affix the connecting element axially on the seat; in other words, to secure it. In manually adjustable backrests the connecting element configured as a hollow section according to the prior art (see, for example, DE 32 29 107 C2) is affixed to the outside of the tilt adjusting fitting. Clip washers, cups, screws or nuts are used as securing elements, for example. This type of axial fixation is associated with significant drawbacks, because the width of the backrest frame has tolerances in millimeters due to manufacturing considerations and due to cost considerations the connecting elements cannot be individually matched to each backrest frame but are pre-fabricated parts. In relatively over-long connecting elements a very annoying rattling noise occurs during movement, because the connecting element has a relatively large, axial play and accordingly can move back and forth. In contrast, with relatively extremely short connecting elements the base of the backrest frame is jammed or wedged in. Obviously, this does not result in a rattling noise but in difficulty moving the tilt adjusting fitting.

These drawbacks are eliminated by a solution disclosed in DE 33 25 045 C2. According to this prior art the connecting element has an expansion abutting on the inner side of one of the tilt adjusting fitting, while on an outer side a manual wheel is arranged for operating the connecting element. The connecting element is thereby secured against axial displacement to one of the tilt adjusting fittings, while it is mounted axially freely displaceable in the other tilt adjusting fitting. In this fashion mounting without rattling or jamming of the connecting element is possible. Nevertheless, using this solution folding back or opening of the tilt adjusting fitting not engaged on both sides cannot be ruled out.

The object of the present invention is to provide a motor vehicle seat of the aforementioned type, which combines the advantages of the prior art; that is, one that prevents folding back or opening of the a tilt adjusting fitting and at the same time allows easy assembly of the connecting element without rattling and axial jamming.

Said object is achieved by the invention by means of a motor vehicle seat with an adjustable reclining backrest according to the present invention.

SUMMARY OF THE INVENTION

In the present invention the bilateral "locking" of one of the tilt adjusting fittings well known from the prior art is combined with a stop on the outer side of the other tilt adjusting fitting. This outside stop has an axial play relative to the adjacent tilt adjusting fitting that is smaller than the width of the toothing of the tilt adjusting fitting. By means of this play of the stop on the one hand difficulty moving the tilt adjusting fitting is avoided and on the other hand folding back or opening of the tilt adjusting is prevented.

Other advantageous embodiments of the invention are apparent from the subordinate claims.

The invention is more completely described below using exemplary embodiments with reference to the associated drawing, wherein:

DETAILED DESCRIPTION OF THE INVENTION

During the course of this description, like numbers will be used to identify like elements according to the different views that illustrate the invention.

Figure 1:
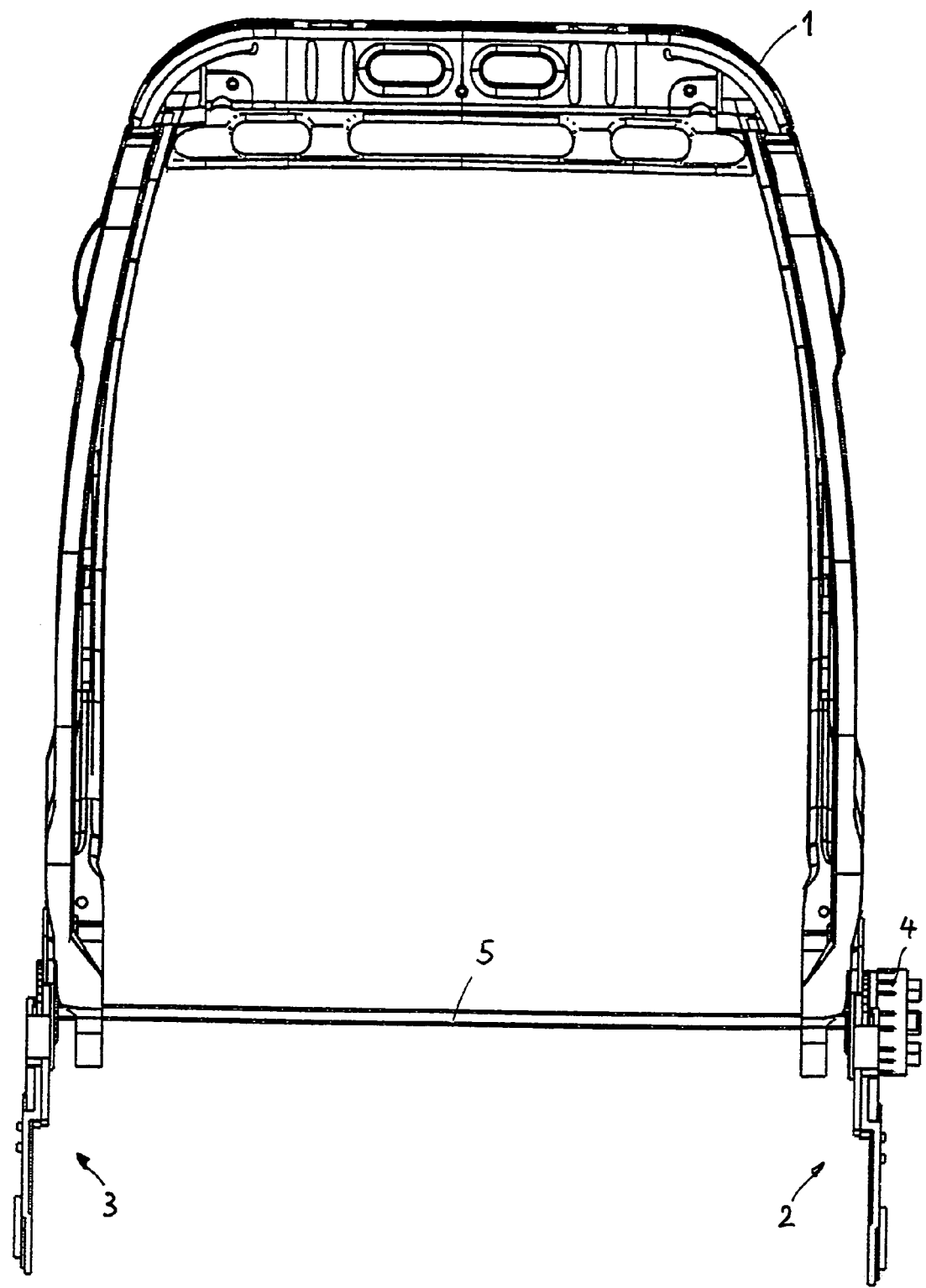
FIG. 1 represents a front view of a backrest frame with mounted tilt adjusting fittings.

FIG. 1 shows a backrest frame 1 with tilt adjusting fittings 2 and 3 mounted bilaterally. A brake 4 is provided on the tilt adjusting fitting 2, said brake intended to prevent any slide-through of the backrest. Brakes 4 of this type belong to the prior art, so that here no further explanation is made and only a diagrammatic representation is provided in the drawing. A hand wheel (not shown) is clipped to the brake 4, said hand wheel being used to adjust the tilt of the backrest. This rotational movement is translated via a connecting tube 5 from the tilt adjusting fitting 2 to the tilt adjusting fitting 3, so that both tilt adjusting fittings 2, 3 can be adjusted at the same time by operating the hand wheel.

Figure 2:
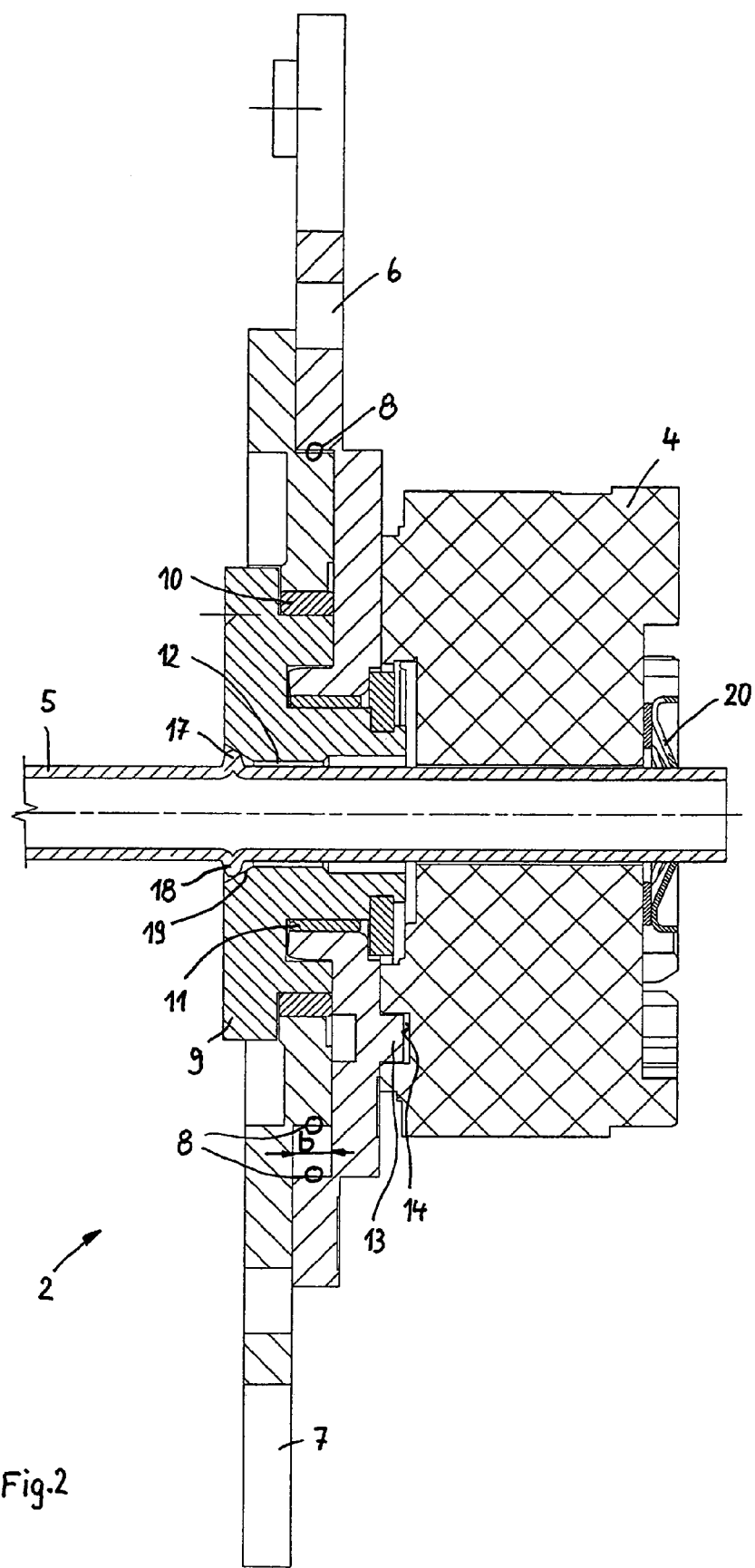
FIG. 2 represents a section through the drive-side tilt adjusting fitting with brake and connecting element in enlarged scale.
Figure 3:
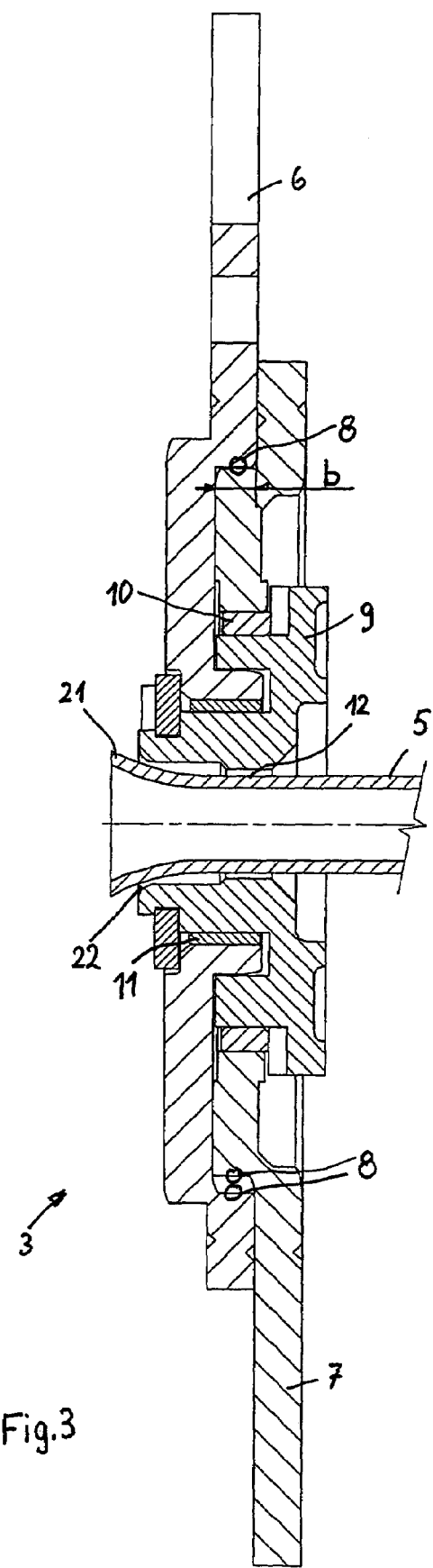
FIG. 3 represents a section through the drive-side tilt adjusting fitting with connecting element in enlarged scale.

FIG. 2 shows the tilt adjusting fitting 2 in longitudinal section. It consists of a fitting part affixed to the rest 6 and a fitting part 7 affixed to the seat frame. These two fitting parts 6, 7 have an inner or outer toothing, which enmesh with each, of a wobble gear type. This toothing is indicated in FIGS. 2 and 3 by small circles, that are indicated by the reference B.

In addition, the tilt adjusting fitting 2 has an eccentric 9, on which the fitting parts 6, 7 are mounted on bearing bushings 10 or 11. The eccentric 9 has an inner square 12, which is form-fittingly engaged by the connecting tube 5, which is configured as a square section. The brake 4 also fits form-fittingly on the connecting tube 5 and further also form-fittingly communicates with the fitting part 6. To do this, corresponding projections 13 are provided thereon and corresponding recesses 14 are provided in brake 4.

Bearing plates (not shown) nested on the fitting parts 6 and 7 hold the structural parts of the tilt adjusting fittings 2 together.

The tilt adjusting fitting 3 is on the other side of the seat, apart from the brake 4 absent there, is constructed substantially identically mirror-image. A further explanation of the tilt adjusting fitting 2, 3 is unnecessary, because these structural parts are part of the prior art and it would not be necessary for an understanding of the invention.

Figure 6:
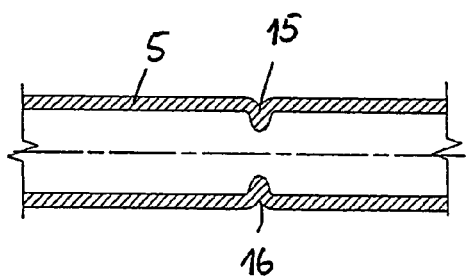
FIG. 6 a second embodiment of the outside stop in top view and in section.
Figure 7:
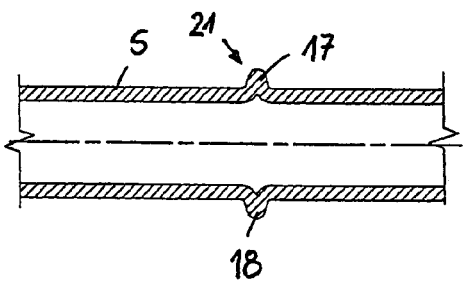
FIG. 7 a side view of the representation according to FIG. 6 in section.

As shown in FIG. 6, opposing, parallel notch-like indentations 15, 16 are provided in the connecting tube 9 immediately alongside the inside of the tilt adjusting fitting 2 for axial fastening of the square connecting tube 5 to the tilt adjusting fitting 2. These notchings can be introduced using a pincer-like tool. By inserting these notches or slots 15, 16, corresponding bulges 17, 18 (see FIG. 2, FIG. 7) occur on the non-notched sides of the connecting tube 9. When mounting the connecting tube 5 these bulges 17, 18 are pushed into a fillet 19 of the inside square 19 of the inside square 12 of the eccentric 9, so that they lie up against their wall, as shown in FIG. 2. On the outside the brake 4 is secured with a star-lock disk 20 on the connecting tube 5, so that the connecting tube 5 is secured on the tilt adjusting fitting 2 in both directions against axial movement.

The connecting tube 5 is provided with a stop 21 on the outside of the tilt adjusting fitting 3. This stop 21 does not abut on the tilt adjusting fitting 3 or on its eccentric 9, but it is arranged with an axial play 22 of same. The axial play 22 is substantially smaller than the width b of the toothing of the lock fitting 2, 3. In virtue of the play 22 between the stop 21 and the tilt adjusting fitting 3, a jamming of the base of the backrest frame 1 and thus difficulty of movement of the tilt adjusting fitting 2, 3 is prevented. At the same time this configuration prevents a folding back or opening of the tilt adjusting fitting 2, 3, because the play 22 is smaller than the tooth width b of the locking toothing.

Figure 4:
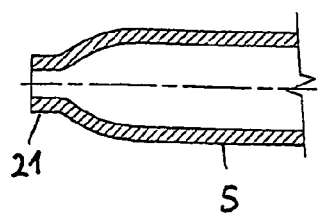
FIG. 4 a view onto the outer stop of the connecting element according to FIG. 3 in section.
Figure 5:
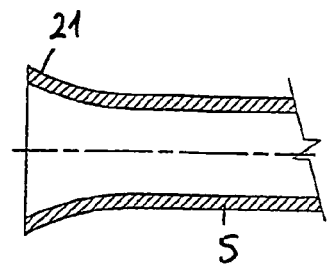
FIG. 5 a side view of the representation according to FIG. 4 in section.
Figure 8:
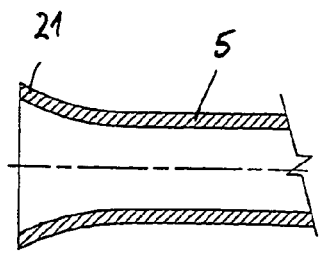
FIG. 8 a third embodiment of the outer stop in top view and side view as well as in section.
Figure 9:
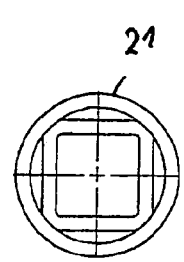
FIG. 9 a front view of the stop according to FIG. 8.

The stop 21 can be embodied in different ways. In the representation according to FIG. 3, it is a flattening (FIG. 4, FIG. 5) or a cupping (FIG. 8, FIG. 9) or even a bulge 17, 18 (FIG. 6, FIG. 7) as on the inside of the tilt adjusting fitting 2. Alternatively to these deformations of the connecting tube 5 the stop can even be formed of clamping elements such as, for example, a star-lock disk, as provided on the outside of the tilt adjusting fitting 2.

While the invention has been described with reference to the preferred embodiment thereof, it will be appreciated by those of ordinary skill in the art that modifications can be made to the parts that comprise the invention without departing from the spirit and scope thereof.

The invention claimed is:

1. An apparatus for adjustably reclining a backrest of a motor vehicle seat, comprising:
    a connecting tube comprising a first stop located at a first end of said connecting tube, a second stop located at a fixed distance from said first stop and a third stop located at a second end of said connecting tube;
    a first tilt adjusting fitting, comprising an inner side and an outer side, a locking toothing, a seat attachment and a backrest attachment, said first tilt adjusting fitting being form fitted to said connecting tube between said first and said second stop such that said first stop abuts the outer side of said first tilt adjusting fitting, and said second stop abuts the inner side of said first tilt adjusting fitting;
    a second tilt adjusting fitting, comprising an outer side, a locking toothing, a seat attachment and a backrest attachment, said second tilt adjusting fitting being form fitted to said connecting tube and located such that said third stop is separated from said outer side of said second tilt adjusting fitting by a distance that is less that the width of said locking toothing.

2. The apparatus of claim 1 wherein said third stop comprises a flattened first end of said connecting tube.

3. The apparatus of claim 1 wherein said third stop comprises a cupped first end of said connecting tube.

4. The apparatus of claim 1 wherein said second stop comprises a bulge in said connecting tube.

5. The apparatus of claim 1 wherein said connecting tube has a square section.

6. The apparatus of claim 5 further comprising two notch-like impressions on opposing parallel sides of said connecting tube and wherein said second stop comprises two corresponding bulges on the un-notched sides of said connecting tube.

7. A method of forming an apparatus for adjustably reclining a backrest of a motor vehicle seat, said method comprising the steps of:
    providing a connecting tube comprising a first stop located at a first end of said connecting tube, a second stop located at a fixed distance from said first stop and a third stop located at a second end of the connecting tube;
    providing a first tilt adjusting fitting comprising an inner side and an outer side, a locking toothing, a seat attachment and a backrest attachment,
    form fitting said first tilt adjusting fitting to said connecting tube such that said first stop abuts the outer side of said first tilt adjusting fitting and said second stop abuts the inner side of said first tilt adjusting fitting;
    providing a second tilt adjusting fitting comprising an outer side, a locking toothing, a seat attachment and a backrest attachment,
    form fitting said second tilt adjusting fitting to said connecting tube such that said third stop is separated from said outer side of said second tilt adjusting fitting by a distance that is less that the width of said locking toothing.

8. The method of claim 7 further comprising the step of flattening said second end of said connecting tube to form said third stop.

9. The method of claim 7 further comprising the step of cupping said second end of said connecting tube to form said third stop.

10. The method of claim 7 wherein said connecting tube has a square section and further comprising the step of notching said connecting tube using a pincer tool, thereby providing two notches on two parallel sides of said connecting tube and two corresponding bulges on the unnotched side of said connecting tube and wherein said two corresponding bulges form said second stop.

* * * * *